Jan. 12, 1943.  K. K. KEARBY  2,307,795
OIL CONVERSION USING SUPERIOR CATALYTIC MASSES
Filed Dec. 14, 1938
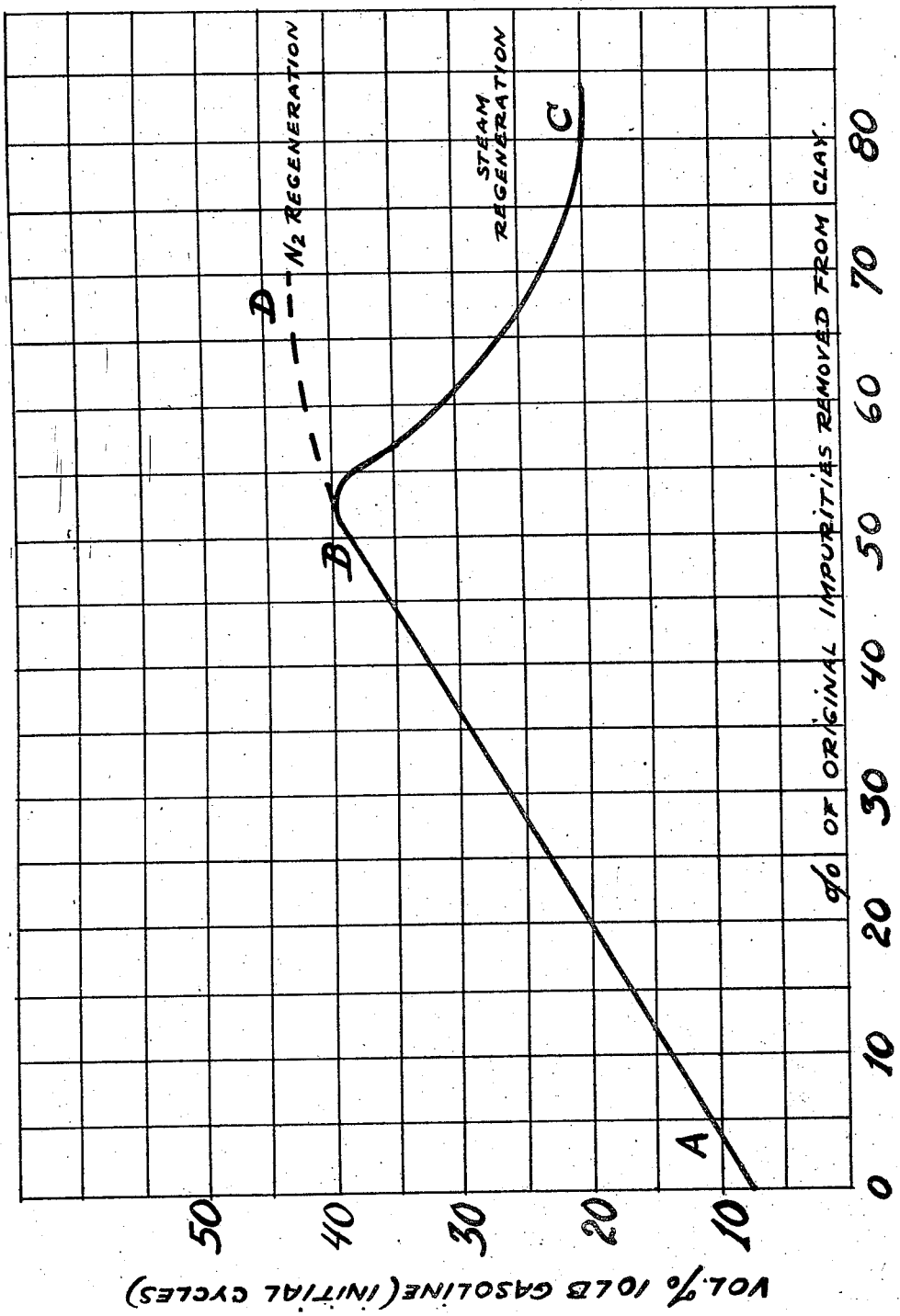
Kenneth K. Kearby Inventor
By ℛ. Young Attorney Patented Jan. 12, 1943

2,307,795

UNITED STATES PATENT OFFICE 2,307,795

OIL CONVERSION USING SUPERIOR CATALYTIC MASSES

Kenneth K. Kearby, Elizabeth, N. J., assignor to Standard Oil Development Company, a corporation of Delaware Application December 14, 1938, Serial No. 245,560

2 Claims. (Cl. 196—52)

This invention deals with the use of activated natural clays as catalysts for various chemical reactions such as cracking, dehydrogenation, polymerization, isomerization, alkylation, and especially to cracking of heavier petroleum hydrocarbons at elevated temperatures wherein the catalyst mass becomes gradually inactivated by the formation of a coke-like deposit, which must be removed before the clay is again sufficiently active for commercial use.

Natural clays are generally aluminum silicates containing various other impurities such as iron, magnesium, calcium, alkali metals, titanium, etc. Certain of these natural clays, as exemplified by fuller's earth, cannot be improved in activity to any substantial extent by acid or alkali treatment. Other clays such as bentonites show a remarkable increase in activity when a portion of the clay mineral is removed by leaching with acids, generally dilute acids such as hydrochloric or sulfuric. It is with these latter clays that this invention is concerned.

Activated bentonitic clays have been used in the prior art for various catalytic reactions such as cracking and dehydrogenation. The art has also realized that at the elevated temperatures employed (400–1000° F.), these clays become gradually coated with a carbonaceous deposit which subsequently causes substantial loss in activity. Such inactivated clays have been satisfactorily regenerated by the use of air together with steam at sufficiently high temperatures to effect combustion of the impurities. In many instances ordinary flue gas containing substantial amounts of moisture has also been employed together with a small amount of air for this purpose, and satisfactory regeneration has been effected in this manner.

In the art, raw bentonitic clays have been activated by treatment with dilute acid (e. g. 5–30% $H_2SO_4$) up to a point where as much as 30% of the impurities have been removed. By "impurities" is meant any ingredients other than alumina and silica present in the raw earth prior to acid treatment. Such treatment has been employed for the manufacture of commercial "Filtrol" which appears to be the only activated bentonitic clay produced commercially in this country.

If cracking of petroleum hydrocarbons is considered, it is found that the activity of the treated clay rises with increase in acid treatment and as the amount of impurities removed is increased, until a maximum point is reached after which the activity drops with further acid treatment. This can be more readily understood by reference to curve A—B—C given in Fig. 1 of the accompanying drawing. It will be observed that the amount of gasoline of 10 lb. Reid vapor pressure obtained by passage over the clay (Polkville clay in this case) increases until a maximum of about 39% gasoline is obtained, when about 58–61% of impurities are removed by the acid treatment. Further acid treatment causes a reduction in the amount of gasoline obtained until, when about 84% of impurities are removed, only about 20% of gasoline is produced. The raw material cracked in this case was West Texas gas oil, the cracking temperature being 850° F. Curve A—B—C shows the activity of the clay after successive regeneration by the usual method employing steam and air as the regenerating medium. In a commercial unit, therefore, the obvious operation would be to employ an acid treatment corresponding to a point at the maximum value.

According to this invention, under certain regeneration conditions, more effective catalysts have been obtained by carrying the acid treatment further past the so-called optimum point which has just been discussed. However, these "over-treated" catalysts are very sensitive to steam during the regeneration operation, losing their activity rapidly and permanently. This high activity can be retained almost indefinitely by avoiding the use of steam during the regeneration operation. When regeneration (which may be advantageously carried out under a pressure of about 2–20 atmospheres) of the "over-activated" catalyst is carried out in a substantial absence of water vapor and preferably in an inert atmosphere of nitrogen or carbon dioxide containing a small amount of oxygen (say 2–10%) an activity curve is obtained corresponding to curve A—B—D shown in Fig. 1. Hence, by this particular treatment and regeneration, it has been possible to remove as much as 70% impurities from the raw clay and yet obtain gasoline yields as high as 43%, provided moisture is excluded from the regeneration gases.

This effect can be more readily understood by reference to the experimental data presented in the following table:

*Sulfuric acid treating of Polkville clay*

| Lbs. H₂SO₄/lb. clay | | 0.175 | 0.35 | 0.70 | 1.05 | 1.40 |
|---|---|---|---|---|---|---|
| Wt. percent conc. of H₂SO₄ | | | 8 | | | |
| Percent of total impurities removed | Raw clay 0 | | 43 | | 53 | 60 |
| Impurities remaining after treatment, percent based on clay | 12.5 | 9.4 | 8.2 | 7.9 | 8.0 | 6.6 |
| Cracking activity vol. percent 10 lb. gasoline cycles 1-4 | 7.5 | 27 | 24 | 28 | 30.5 | 20 |

It can be seen that the activity of the treated Polkville clays increases with increasing removal of impurities up to a certain point where the amount and/or concentration of acid necessary for further removal renders the clay inactive indicating extreme sensitivity to steam during regeneration. By carrying out the regeneration in the absence of steam according to this invention, it is possible to obtain a higher sustained activity.

The effect of sulfuric acid treating on the composition of Ittawamba clay (which is another bentonitic clay susceptible to acid treatment) is shown in the following table from which it can be observed that increasing strength of treat above 0.35 lb. of acid per pound of clay has little effect on the removal of impurities, yet renders the products highly sensitive to steam regeneration, showing that the "over-treatment" has in some manner affected the structure of the catalytic surface:

*Sulfuric acid treating of Ittawamba clay*

| Lbs. acid/lb. clay (8% conc.) | (Raw clay) | 0.35 | 0.525 | 1.05 |
|---|---|---|---|---|
| Impurities remaining after treatment, per cent based on clay | 14.8 | 9.2 | 9.6 | 9.3 |
| Cracking activity vol. per cent 10 lb. gasoline (extrapolated to initial cycle), using steam-air regeneration | | 40 | 32 | 26 |

However, if the regeneration is carried out in the substantial absence of steam, no substantial loss in activity is observed upon regeneration of these "over-treated" clays and much higher yields of gasoline are obtained.

In carrying out this invention, therefore, it is desirable to "over-treat" the clay by treating with acid to a point past the optimum indicated when steam regeneration is employed. During the cracking period steam may be admitted with the feed stock to the extent of up to 2-5% without suffering any damage to the "over-treated" catalyst employed. However, upon regeneration with oxygen, it is extremely important that steam be eliminated, and it is preferable that not more than 5% or even 1% or so be present in the regenerating medium. It is not understood why the steam exhibits such a strong permanent deactivating effect upon the clay in its "over-treated" stage, but it appears to effect the internal structure of the clay in some manner as to cause its substantial breakdown when employed for cracking in the next succeeding operation.

The drawing shows a comparison of regenerations using nitrogen and using steam.

The invention will be more clearly understood from the following examples which show some of the many phases involved in the present invention:

*Example 1.*—A raw Polkville clay analyzing:

| | Per cent |
|---|---|
| $SiO_2$ | 66.09 |
| $Al_2O_3$ | 21.39 |
| $Fe_2O_3$ | 3.18 |
| $TiO_2$ | 0.50 |
| $MgO$ | 5.89 |
| $CaO$ | 2.87 |
| $Na_2O$ | 0.02 |
| $K_2O$ | 0.18 | was treated with 0.35 lb. sulfuric acid (diluted to 8% conc.) per pound of clay, giving a clay having the following analysis:

| | Per cent |
|---|---|
| $SiO_2$ | 71.50 |
| $Al_2O_3$ | 20.30 |
| $Fe_2O_3$ | 1.52 |
| $TiO_2$ | 0.46 |
| $MgO$ | 4.61 |
| $CaO$ | 1.23 |
| $Na_2O$ | 0.04 |
| $K_2O$ | 0.11 |

A West Texas gas oil was cracked, using the latter treated clay as a catalyst, with a velocity of 1.2 volumes of oil per volume of catalyst per hour for one-hour periods at 850° F., using air-steam regeneration. At the end of 8 cycles the amount of stable gasoline produced was 34% by volume based on the original feed stock.

*Example 2.*—A sample of the raw Polkville clay given in Example 1 was treated with 1.05 lbs. sulfuric acid (diluted to 8% conc.) per pound of clay, giving a treated clay having the following analysis:

| | Per cent |
|---|---|
| $SiO_2$ | 75.00 |
| $Al_2O_3$ | 17.01 |
| $Fe_2O_3$ | 1.76 |
| $TiO_2$ | 0.53 |
| $MgO$ | 4.55 |
| $CaO$ | 0.60 |
| $Na_2O$ | 0.07 |
| $K_2O$ | 0.05 |

This clay was also employed as a catalyst for the cracking of West Texas gas oil under the same conditions of operation and regeneration as given in Example 1. At the end of 4 cycles a 39.5% by volume yield of stable gasoline was obtained, while at the end of 12 cycles the yield was 38%. It will be observed that this gasoline yield was higher than that obtained in Example 1.

*Example 3.*—A raw Polkville clay of the analysis given in Example 1 was treated with 1.40 lbs.

sulfuric acid (diluted to 8% conc.) per pound of clay giving a treated clay having the following analysis:

| | Per cent |
|---|---|
| $SiO_2$ | 77.60 |
| $Al_2O_3$ | 15.77 |
| $Fe_2O_3$ | 1.64 |
| $TiO_2$ | 0.35 |
| MgO | 4.06 |
| CaO | 0.31 |
| $Na_2O$ | 0.04 |
| $K_2O$ | 0.11 |

This clay was also employed as a catalyst for cracking of West Texas gas oil under the same conditions of operation and regeneration as given in Example 1. At the end of the fourth cycle the yield of stable gasoline was 29.2%, while at the end of the sixteenth cycle the yield was 28.7%. It will be noted that these yields are lower than those given in the previous example, showing that the clay activity reached an optimum at a treatment corresponding to about 1.05 lbs. of acid per pound of clay.

*Example 4.*—A sample of raw Polkville clay having the same analysis as that given in Example 1 was treated with 0.35 lb. of acid per pound of clay (diluted to 8% conc.), and submitted to the cracking of West Texas gas oil under the same conditions as those given in Example 1. The regeneration of this treated clay, however, was carried out in the substantial absence of steam, the regenerating medium being air diluted with nitrogen. At the end of the fourth cycle the yield of stable gasoline amounted to 36.5%.

*Example 5.*—In this experiment the raw Polkville clay was treated with 1.05 lbs. of acid per pound as in Example 2, and the regeneration was carried out in the absence of steam as described in Example 4. The yield of stable gasoline at the end of the fourth cycle amounted to 39.5% by volume.

*Example 6.*—The Polkville clay was treated with 1.40 lbs. of acid per pound of clay as in Example 3 and regenerated in the absence of steam as described in Example 4. At the end of the fifth cycle in this case the yield of stable gasoline was 39.5% by volume.

*Example 7.*—Treating the Polkville clay of Example 6 even more strongly, a removal of 70% of the impurities was effected as compared to 60% removed by the treat given in the previous example. This clay gave, under similar testing conditions in the absence of moisture, a conversion to stable gasoline of 43%. It is thus apparent that this combination of a high degree of acid treating with exclusion of steam from the regeneration gases has produced a higher conversion to gasoline than any of the previous examples.

The last four experiments show that if steam is excluded during regeneration, the activity of the regenerated clay increases with increase in acid treatment of the clay up to the highest acid treatment given in Example 7, whereas the treated clays regenerated with steam and air as shown by Examples 1 to 3 appear to go through an optimum point for the acid treatment which optimum point is lower than the yield given in Example 7, using a clay which would normally be considered an "over-treated" clay. The term "over-treated" clay in this specification is used to designate clays obtained after drastic treatment, the amount of reagent employed being more than that necessary for obtaining an "optimum" activity when steam-air regeneration is employed.

Various other modifications and alterations may be made within the spirit and scope of the invention, but the invention is not limited to any examples or to any theory or mechanism of operation, but only to the following claims in which it is intended to cover the invention as broadly as the prior art permits:

I claim:

1. In the catalytic conversion of hydrocarbon oils wherein the conversion is effected in the presence of acid activated clays and wherein said clays are subjected to periodic regenerating treatments with an oxidizing gas to remove carbonaceous deposits formed during the conversion operation, the improvement which comprises employing as a catalyst in said process a bentonitic clay which in raw state has been pretreated with a diluted strong mineral acid in an amount to remove over 50% of its original impurities, and carrying out the regeneration of said clay in the absence of a substantial amount of water vapor.

2. In the catalytic conversion of hydrocarbon oils wherein the conversion is effected in the presence of acid activated clays and wherein said clays are subjected to periodic regenerating treatments with an oxidizing gas to remove carbonaceous deposits formed during the conversion operation, the improvement which comprises employing as a catalyst in said process a bentonitic clay which in raw state has been pretreated with diluted sulfuric acid in an amount to remove over 50% of its impurities and carrying out the regeneration of said clay in the absence of a substantial amount of water vapor.

KENNETH K. KEARBY.